(12) United States Patent
Nakamura et al.

(10) Patent No.: US 9,709,184 B2
(45) Date of Patent: Jul. 18, 2017

(54) CONTROL VALVE

(71) Applicant: KAYABA INDUSTRY CO., LTD., Minato-ku, Tokyo (JP)

(72) Inventors: Yoshinari Nakamura, Kanagawa (JP); Kiyokazu Nagata, Tokyo (JP)

(73) Assignee: KYB Corporation, Tokyo (JP)

( * ) Notice: Subject to any disclaimer, the term of this patent is extended or adjusted under 35 U.S.C. 154(b) by 26 days.

(21) Appl. No.: 14/378,325

(22) PCT Filed: Feb. 18, 2013

(86) PCT No.: PCT/JP2013/053863
§ 371 (c)(1),
(2) Date: Aug. 13, 2014

(87) PCT Pub. No.: WO2013/136914
PCT Pub. Date: Sep. 19, 2013

(65) Prior Publication Data
US 2015/0013787 A1    Jan. 15, 2015

(30) Foreign Application Priority Data

Mar. 15, 2012 (JP) ................................. 2012-059443

(51) Int. Cl.
*F16K 17/02* (2006.01)
*F16K 47/16* (2006.01)
(Continued)

(52) U.S. Cl.
CPC ............. *F16K 17/02* (2013.01); *F16K 47/08* (2013.01); *F16K 47/16* (2013.01); *G05D 7/00* (2013.01);
(Continued)

(58) Field of Classification Search
CPC .......... F16K 17/02; F16K 47/16; F16K 47/08; F16K 3/24; G05D 7/00; G05D 16/10;
(Continued)

(56) References Cited

U.S. PATENT DOCUMENTS 4,108,210 A    8/1978   Luthe et al.
4,397,331 A    8/1983   Medlar
(Continued)

FOREIGN PATENT DOCUMENTS

DE    4237451 A1    5/1994
JP     529119 A     1/1977
(Continued)

OTHER PUBLICATIONS

Extended European Search Report dated Sep. 16, 2015, corresponding to European Patent Application No. 13760990.5.
(Continued)

*Primary Examiner* — Michael R Reid
(74) *Attorney, Agent, or Firm* — Hauptman Ham, LLP

(57) ABSTRACT

A control valve configured to control a pressure of a passing fluid includes: a valve seat having a seat portion where the fluid passes; a poppet valve inserted into the valve seat to regulate a pressure of the fluid passing through the seat portion; and a fluid rectifying unit provided in the valve seat to rectify the fluid having a pressure regulated by the poppet valve.

11 Claims, 4 Drawing Sheets

(51) Int. Cl.
*G05D 16/10* (2006.01)
*G05D 7/00* (2006.01)
*F16K 47/08* (2006.01)

(52) U.S. Cl.
CPC ........ *G05D 16/10* (2013.01); *Y10T 137/7793* (2015.04)

(58) Field of Classification Search
CPC .... G05D 16/103; G05D 16/106; G05D 16/02; G05D 16/04; Y10T 137/7793; Y10T 137/7796
USPC ............................................ 137/505, 505.13
See application file for complete search history.

(56) References Cited

U.S. PATENT DOCUMENTS

| | | | |
|---|---|---|---|
| 5,261,453 A | 11/1993 | Hekkert et al. | |
| 5,522,422 A | 6/1996 | Beck | |
| 7,357,143 B2 * | 4/2008 | Cho | G05D 16/0669 137/14 |
| 2006/0169328 A1 | 8/2006 | Cho et al. | |
| 2011/0114867 A1 * | 5/2011 | Suzuki | G05D 16/10 251/324 |

FOREIGN PATENT DOCUMENTS

| | | |
|---|---|---|
| JP | 10169792 A | 6/1998 |
| JP | 2008267558 A | 11/2008 |
| JP | 201026825 A | 2/2010 |
| JP | 2011227844 A | 11/2011 |
| KR | 10-2006-0070147 A | 6/2006 |
| WO | WO 02090806 A1 * | 11/2002 ............. F16K 47/08 |

OTHER PUBLICATIONS

International Search Report and Written Opinion mailed Mar. 12, 2013, corresponding International Application No. PCT/JP2013/053863.

* cited by examiner

CONTROL VALVE

TECHNICAL FIELD

This invention relates to a control valve for controlling a gas pressure guided from a gas supply source to a gas supply destination.

BACKGROUND ART

For example, a fuel cell system has a control valve for controlling a high pressure (primary pressure) fuel gas guided from a fuel tank into a predetermined low pressure (secondary pressure) and supplies it to a fuel cell.

As a control valve provided in a circuit where a gas having a high pressure and a high flow rate flows in a fuel cell system or the like, JP 1998-169792 A discloses a valve having a slit formed between a plurality of plates by alternately stacking plates and elastic spacers.

In addition, JP 2010-026825 A discloses a poppet type decompression valve. This poppet type decompression valve has a seat portion where a gas passes and a poppet valve that faces the seat portion so that a poppet-throttling fluid path is defined between the seat portion and the poppet valve.

SUMMARY OF INVENTION

In such a type of the control valve provided in a circuit where a gas flows with a high pressure and high flow rate, a vortex is generated in the downstream side of a portion for throttling a high pressure gas so that a high-frequency noise is disadvantageously generated from the gas flow.

It is therefore an object of this invention to reduce a noise in a control valve.

According to one aspect of this invention, a control valve configured to control a pressure of a passing fluid includes a valve seat having a seat portion where the fluid passes, a poppet valve inserted into the valve seat to regulate a pressure of the fluid passing through the seat portion, and a fluid rectifying unit provided in the valve seat to rectify the fluid having a pressure regulated by the poppet valve.

The foregoing and additional features and characteristics of this disclosure will become more apparent from the following detailed description considered with the reference to the accompanying drawings.

DESCRIPTION OF EMBODIMENTS

Hereinafter, embodiments of this invention will be described with reference to the accompanying drawings.

First Embodiment

Figure 1:
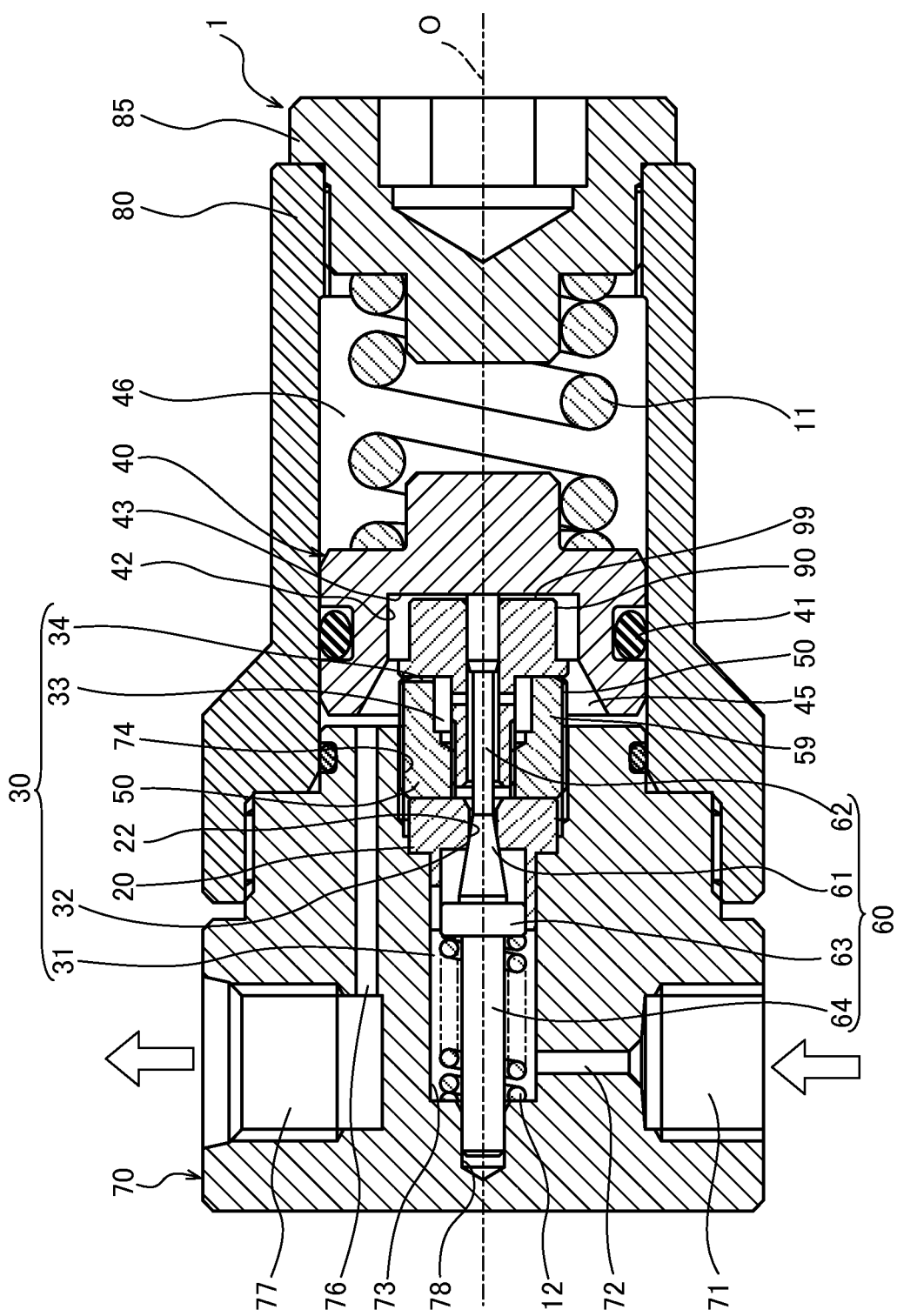
FIG. 1 is a longitudinal cross-sectional view illustrating a control valve according to a first embodiment of this invention.

A control valve 1 shown in FIG. 1 is used in a fuel cell system. The control valve 1 controls a fuel gas (hereinafter, referred to as a "gas") having a pressure of, for example, 30 to 70 MPa, guided from a fuel tank (hereinafter, referred to as a "gas supply source") into a predetermined pressure of several MPa and supplies it to a fuel cell (hereinafter, referred to as a "gas supply destination"). It is noted that, although the control valve 1 guides a hydrogen gas as a fuel gas in this embodiment, the invention is not limited thereto. Instead, the control valve 1 may be provided in a circuit where a fluid flows with a high pressure and a high flow rate in other apparatuses, utilities, or the like in which other gases or liquids are guided.

The control valve 1 includes a valve seat 20 having a seat portion 22 where a gas passes, a poppet valve 60 that throttles a gas flow passing through the seat portion 22, and a piston 40 that drives the poppet valve 60 by virtue of a gas pressure in the downstream side of the valve seat 20. In addition, the control valve 1 includes a spring 11 provided in a rear side of the piston 40 to bias the poppet valve 60 to a valve open direction and a spring 12 that biases the poppet valve 60 to a valve close direction against the biasing force of the spring 11.

When the control valve 1 is operated, the piston 40 and the poppet valve 60 move in a horizontal direction of FIG. 1 in response to a gas pressure guided from the gas supply source so that the poppet valve 60 throttles a gas flow passing through the seat portion 22. As a result, the gas pressure guided to the gas supply destination is controlled to a setting value.

The control valve 1 has a valve housing 70 and a piston housing 80 as a casing. The valve seat 20, the poppet valve 60, and the spring 12 are housed in the valve housing 70.

The control valve 1 includes a primary port 71 opened to the valve housing 70, a poppet passage 30 where the poppet valve 60 is inserted, a control pressure chamber 45 defined by the piston 40, and a secondary port 77 opened to the valve housing 70.

The gas supplied from the gas supply source flows to the primary port 71 as indicated by the arrow in the drawings and flows to the poppet passage 30 through a through-hole 72. A flow rate (pressure) of the gas passing through the poppet passage 30 is adjusted by throttling a gap between the seat portion 22 and the poppet valve 60. The lowered gas pressure passing through the poppet passage 30 is guided to the control pressure chamber 45, and the piston 40 drives the poppet valve 60 until this gas pressure reaches a predetermined value. The gas passing through the control pressure chamber 45 is guided to the gas supply destination through the through-hole 76 and the secondary port 77.

The poppet passage 30 includes a poppet upstream path 31 communicating with the primary port 71, a poppet-throttling fluid path 32 defined between the seat portion 22 and the poppet valve 60, a poppet downstream path 33 defined in the downstream side of the poppet-throttling fluid path 32, and a communicating path 34 that causes the poppet downstream path 33 and the control pressure chamber 45 to communicate with each other.

The poppet valve 60 has a poppet valve body 61 facing the seat portion 22. Meanwhile, as illustrated in FIG. 2, the valve seat 20 has a portion of defining the poppet passage 30 which include a seat portion 22 having a truncated conical shape (fan-like tapered shape) whose diameter is reduced to the downstream side, a cylindrical communicating path 23, and an outlet portion 24 having a truncated conical shape (fan-like tapered shape) whose diameter is enlarged to the downstream side.

An annular poppet-throttling fluid path 32 is defined between the seat portion 22 and the poppet valve body 61.

Figure 2:
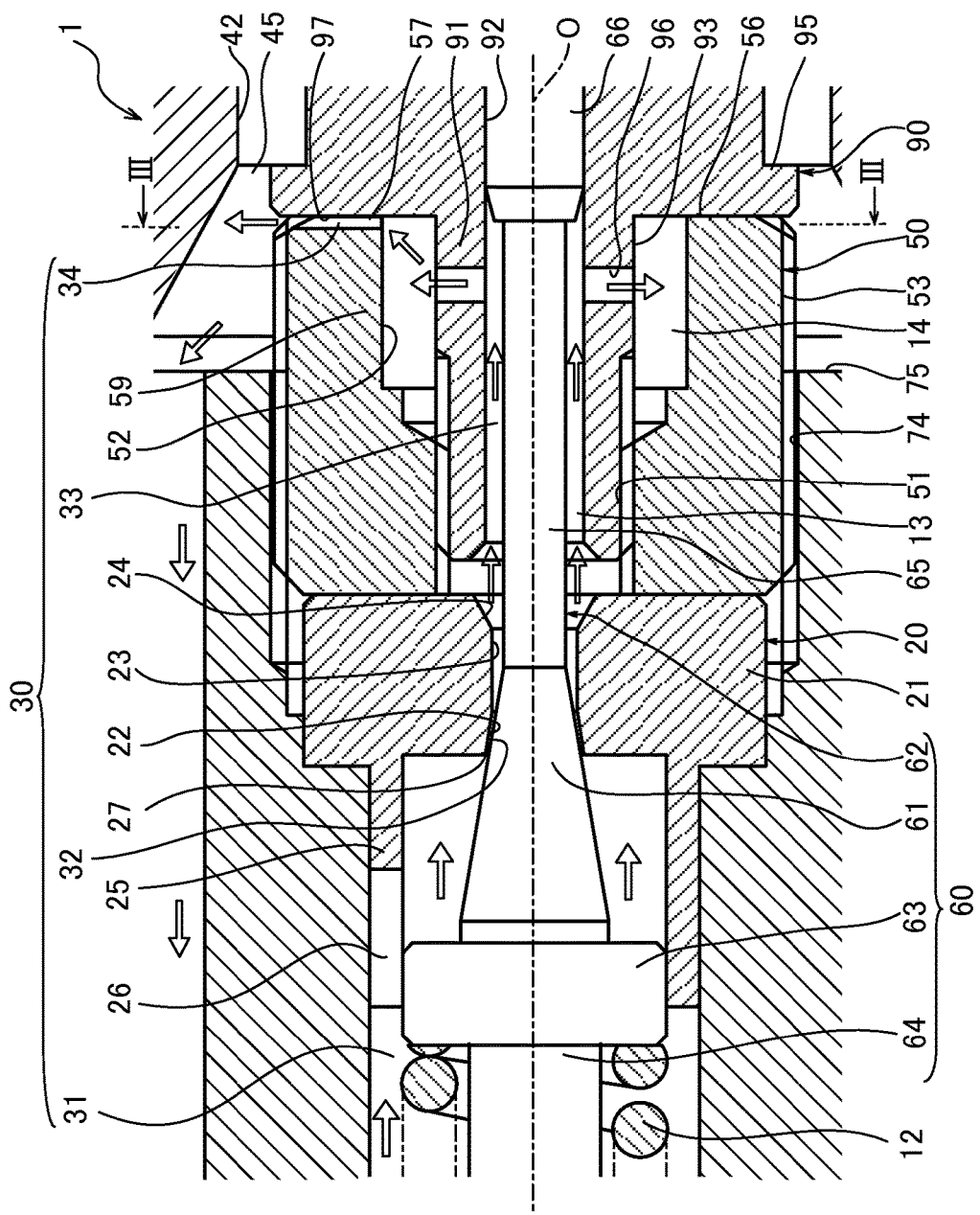
FIG. 2 is a longitudinal cross-sectional view obtained by enlarging a part of FIG. 1.

As the poppet valve 60 moves to the left in FIGS. 1 and 2 and recedes from the seat portion 22, the cross-sectional area of the poppet-throttling fluid path 32 is enlarged.

Each of an inner circumferential surface of the seat portion 22 and an outer circumferential surface of the poppet valve body 61 is formed in a truncated conical shape (fan-like tapered shape) concentrically extending with respect to the center line O. In the longitudinal cross section including the center lines O of the seat portion 22 and the poppet valve body 61, an angle between a pair of virtual lines (straight lines) (not illustrated) along the inner circumferential surface of the seat portion 22 is smaller than an angle between a pair of virtual lines (straight lines) along the outer circumferential surface of the poppet valve body 61 by a predetermined angle difference. As a result, at the time of valve close, the poppet valve body 61 seats on a seat edge portion 27 formed in a base end of the seat portion 22 to ensure sealing performance.

The poppet valve 60 has a rod 62 that extends from a leading end of the poppet valve body 61 and is connected to the piston 40. Since the poppet valve 60 is connected to the piston 40 through the rod 62, it moves in synchronization with the piston 40.

In the valve housing 70, a passage hole 73 that defines a poppet upstream path 31 and a screw hole 74 opened to an end face 75 of the passage hole 73 are concentrically formed with respect to the center line O.

The valve seat 20 has a cylindrical guide cylinder portion 25 fitted to the passage hole 73 and a disk-like partitioning portion 21 seating on a bottom of the screw hole 74. The valve seat 20 is installed in the valve housing 70.

The poppet valve 60 has an annular guide portion 63 protruding toward the base end side of the poppet valve body 61 in a radial direction. This guide portion 63 is slidably inserted into the guide cylinder portion 25 of the valve seat 20. The poppet valve 60 is concentrically supported with respect to the center line O of the valve seat 20 using the guide portion 63. The poppet-throttling fluid path 32 having a truncated conical shape has an even gap (fluid path width) along a circumferential direction thereof.

A notch portion 26 is formed in the cylindrical guide cylinder portion 25. Through this notch portion 26, the upstream side and the downstream side of the guide portion 63 communicate with each other. It is noted that the invention is not limited thereto. Instead, a through-hole may be formed in the guide portion 63 so that the upstream side communicates with the downstream side.

The poppet valve 60 has a guide pin portion 64 protruding from the guide portion 63 in an axial direction. Meanwhile, a guide hole 78 where the guide pin portion 64 is slidably inserted is formed in the valve housing 70. The poppet valve 60 is concentrically supported with respect to the center line O of the valve seat 20 as the guide pin portion 64 is slidably inserted into the guide hole 78.

A pressure of the gas flowing through the poppet passage 30 is regulated by the poppet valve body 61. In the poppet passage 30, a vortex is generated because a flow velocity increases.

In order to cope with the vortex, a fluid rectifying unit 50 that rectifies the fluid having a pressure regulated by the poppet valve body 61 is provided in the piston 40 side of the valve seat 20.

The fluid rectifying unit 50 is provided in an end portion of the valve seat 20, and the seat portion 22 and the fluid rectifying unit 50 are arranged side by side along the axial direction of the poppet valve 60.

The fluid rectifying unit 50 is screwed to the screw hole 74 of the valve housing 70. A male thread screwed to the screw hole 74 is formed in the outer circumferential surface 53 of the fluid rectifying unit 50. The valve seat 20 is interposed between the fluid rectifying unit 50 and the valve housing 70.

A female thread 51 is formed in the inner circumference of the fluid rectifying unit 50, and a plug 90 is screwed to the female thread 51.

The plug 90 includes a cylinder portion 91 screwed to the female thread 51 of the fluid rectifying unit 50 and a flange portion 95 abutting on the end face 56 of the fluid rectifying unit 50.

According to this invention, the fluid rectifying unit 50 and the valve seat 20 are separately formed. However, the fluid rectifying unit 50 and the valve seat 20 may be integrated into a single body.

The rod 62 of the poppet valve 60 includes a small-diameter rod portion 65 connected to the leading end of the poppet valve body 61 and a larger-diameter rod portion 66 formed to have a diameter enlarged from the small-diameter rod portion 65 and connected to the piston 40. The larger-diameter rod portion 66 is slidably inserted into the inner circumferential surface 92 of the plug 90.

A poppet downstream path 33 is provided between the fluid rectifying unit 50 and the poppet valve 60. An annular gap 13 is defined between the small-diameter rod portion 65 and the inner circumferential surface 92 of the plug 90. An annular gap 14 is defined between the outer circumferential surface 93 of the plug 90 and the inner circumferential surface 52 of the fluid rectifying unit 50. In the plug 90, a plurality of through-holes 96 that cause the gap 13 and the gap 14 to communicate with each other are formed to provide a poppet downstream path 33.

The cylindrical end portion of the fluid rectifying unit 50 is included in a poppet downstream path wall portion 59 that introduces the gas passing through the poppet-throttling fluid path 32 into the communicating path 34. The poppet downstream path wall portion 59 defines the poppet downstream path 33, and a communicating path 34 is opened in the poppet downstream path wall portion 59.

The communicating path 34 extends from the poppet downstream path 33 in a radial direction of the poppet valve 60 (in a center line S direction).

The communicating path 34 serves as a rectifying path by virtue of a trench or a groove 57 formed by performing a press working or a cut working for the end face 56 of the fluid rectifying unit 50. The depth of the trench 57 is set to an arbitrary value (for example, 0.1 to 0.2 mm). The shape and the depth of the trench 57 may change depending on a required characteristic. Therefore, the setting of the gas pressure of the control valve 1 can be easily adjusted. It is noted that the trench 57 may be provided in the end face 97 of the plug 90.

Figure 3:
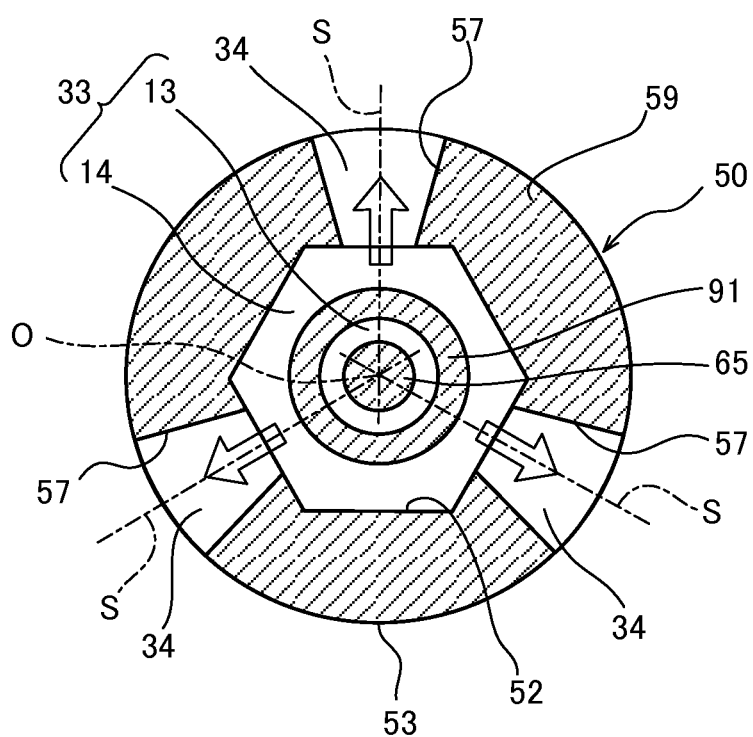
FIG. 3 is a cross-sectional view taken along a line III-III of FIG. 2.

FIG. 3 is a cross-sectional view illustrating the fluid rectifying unit 50 taken along a line III-III of FIG. 2. As illustrated in FIG. 3, three trenches 57 are formed in the fluid rectifying unit 50. It is noted that the number of trenches 57 is not limited to three, but may be arbitrarily set depending on required performance.

Each trench 57 is formed in a radial shape such that the center line S of the trench 57 extends in a radial direction centered at the center line O. Each trench 57 is formed with an even interval in a circumferential direction.

A longitudinal cross section of the trench 57 is formed in a fan shape. An opening width perpendicular to the center line S of the trench 57 gradually increases toward an outer diameter direction centered at the center line O. As a result, a cross-sectional area of the communicating path 34 is gradually enlarged from the upstream side to the downstream side of the communicating path 34.

The fluid rectifying unit 50 has a hexagonal cross-sectional inner circumferential surface 52 and a circular cross-sectional outer circumferential surface 53. One end of the trench 57 is opened to the inner circumferential surface 52, and the other end is opened to the outer circumferential surface 53. As a result, one end of the communicating path 34 faces the poppet downstream path 33, and the other end faces the control pressure chamber 45.

A cross-sectional area of the trench 57 opened to the inner circumferential surface 52 of the fluid rectifying unit 50 corresponds to a minimum cross-sectional area of the communicating path 34. The minimum cross-sectional area of the communicating path 34 is set to be larger than the maximum cross-sectional area of the poppet-throttling fluid path 32. As a result, a resistance (pressure loss) applied by the poppet-throttling fluid path 32 against a gas flow passing through the poppet passage 30 is stronger than a resistance applied by the communicating path 34. For this reason, by changing the cross-sectional area of the poppet-throttling fluid path 32, it is possible to adequately control the gas pressure guided to the control pressure chamber 45 with excellent responsiveness.

As illustrated in FIG. 1, the control pressure chamber 45 is defined as an annular space around the fluid rectifying unit 50 and the plug 90. A concave portion 42 that defines the control pressure chamber 45 is formed in the piston 40. The fluid rectifying unit 50 and the plug 90 are arranged in the inside of the concave portion 42. As a result, it is possible to reduce a size of the control valve 1 and also obtain a sufficient volume of the control pressure chamber 45.

The cylindrical piston housing 80 is engaged with one end of the valve housing 70. The piston 40 is slidably inserted into the piston housing 80 by interposing an O-ring 41.

A cap 85 is engaged with one end of the piston housing 80. A spring 11 having a coil shape is compressively inserted between the piston 40 and the cap 85.

A back pressure chamber 46 is defined between the piston 40 and the cap 85. A spring 11 that biases the poppet valve 60 in a valve open direction is housed in the back pressure chamber 46, and an atmospheric pressure as a pilot pressure is guided to the back pressure chamber 46 from the outside through a through-hole (not illustrated).

Hereinafter, an operation of the control valve 1 will be described. As indicated by the arrows in FIGS. 1 and 2, the gas supplied from the gas supply source to the primary port 71 sequentially passes through the poppet upstream path 31, the poppet-throttling fluid path 32, the poppet downstream path 33, and the communicating path 34 in the poppet passage 30 and is guided to the control pressure chamber 45. Then, the gas is guided from the control pressure chamber 45 to the gas supply destination through the through-hole 76 and the secondary port 77.

In FIGS. 1 and 2, the gas from the primary port 71 flows to the right direction along the poppet valve 60, subsequently turns at the communicating path 34 and the control pressure chamber 45, and flows to the left direction through the through-hole 76. As a result, it is possible to arrange both the primary port 71 and the secondary port 77 in one end of the valve housing 70. Therefore, it is possible to prevent a size of the control valve 1 from increasing.

A biasing force generated by the spring force difference between the springs 11 and 12 is applied to the poppet valve 60 in a valve open direction, and a biasing force generated by the pressure difference between the control pressure chamber 45 and the back pressure chamber 46 is applied in a valve close direction. The poppet valve 60 moves to a position where such biasing forces match so that the cross-sectional area of the poppet-throttling fluid path 32 changes. As a result, a resistance applied to the gas flow passing through the poppet-throttling fluid path 32 changes, and the pressure in the control pressure chamber 45 and the secondary port 77 is maintained at a setting value.

If a pressure of the control pressure chamber 45 decreases under the setting value, the poppet valve 60 moves to the left direction in FIG. 1. As a result, the cross-sectional area of the poppet-throttling fluid path 32 increases, and the pressure of the control pressure chamber 45 increases and approaches the setting value. As the bottom face 43 of the concave portion 42 of the piston 40 abuts on the end face 99 of the plug 90, a movement of the poppet valve 60 is restricted so that an opening level of the control valve 1 is maximized. It is noted that, even when the bottom face 43 of the concave portion 42 of the piston 40 abuts on the end face 56 of the fluid rectifying unit 50, a gas flow path (not illustrated) is obtained therebetween.

Meanwhile, if the pressure of the control pressure chamber 45 increases over a setting value, the poppet valve 60 moves to the right direction in FIG. 1. As a result, the cross-sectional area of the poppet-throttling fluid path 32 decreases so that the pressure of the control pressure chamber 45 decreases to the setting value. As the poppet valve body 61 abuts on the seat portion 22, the movement of the poppet valve 60 is restricted so that the opening level of the control valve 1 is minimized (to zero), and the gas flow is blocked.

A pressure of the gas flowing through the poppet passage 30 is regulated by the poppet valve 60. If a pressure difference before and after the poppet-throttling fluid path 32 is high, a vortex is generated in the downstream side of the poppet-throttling fluid path 32.

As the gas having such a vortex flows to the communicating path 34 formed in the fluid rectifying unit 50 from the poppet downstream path 33, the flow thereof is rectified. By rectifying the vortex generated in the downstream side of the poppet-throttling fluid path 32, it is possible to prevent a noise from being generated from the control valve 1.

Since the cross-sectional area of the communicating path 34 gradually increases toward the downstream side, the pressure of the gas flowing through the communicating path 34 gradually decreases. Therefore, it is possible improve an effect of rectifying the gas flow and suppress a resistance applied to the gas flow.

Furthermore, the communicating path 34 is provided in the upstream side of the control pressure chamber 45. For this reason, the pressure of the control pressure chamber 45 is controlled by the resistance applied by the poppet-throttling fluid path 32 and the communicating path 34 to the gas flow, and a change of the gas pressure guided to the secondary port 77 is suppressed by the resistance applied to the gas flow by the communicating path 34.

Second Embodiment

Figure 4:
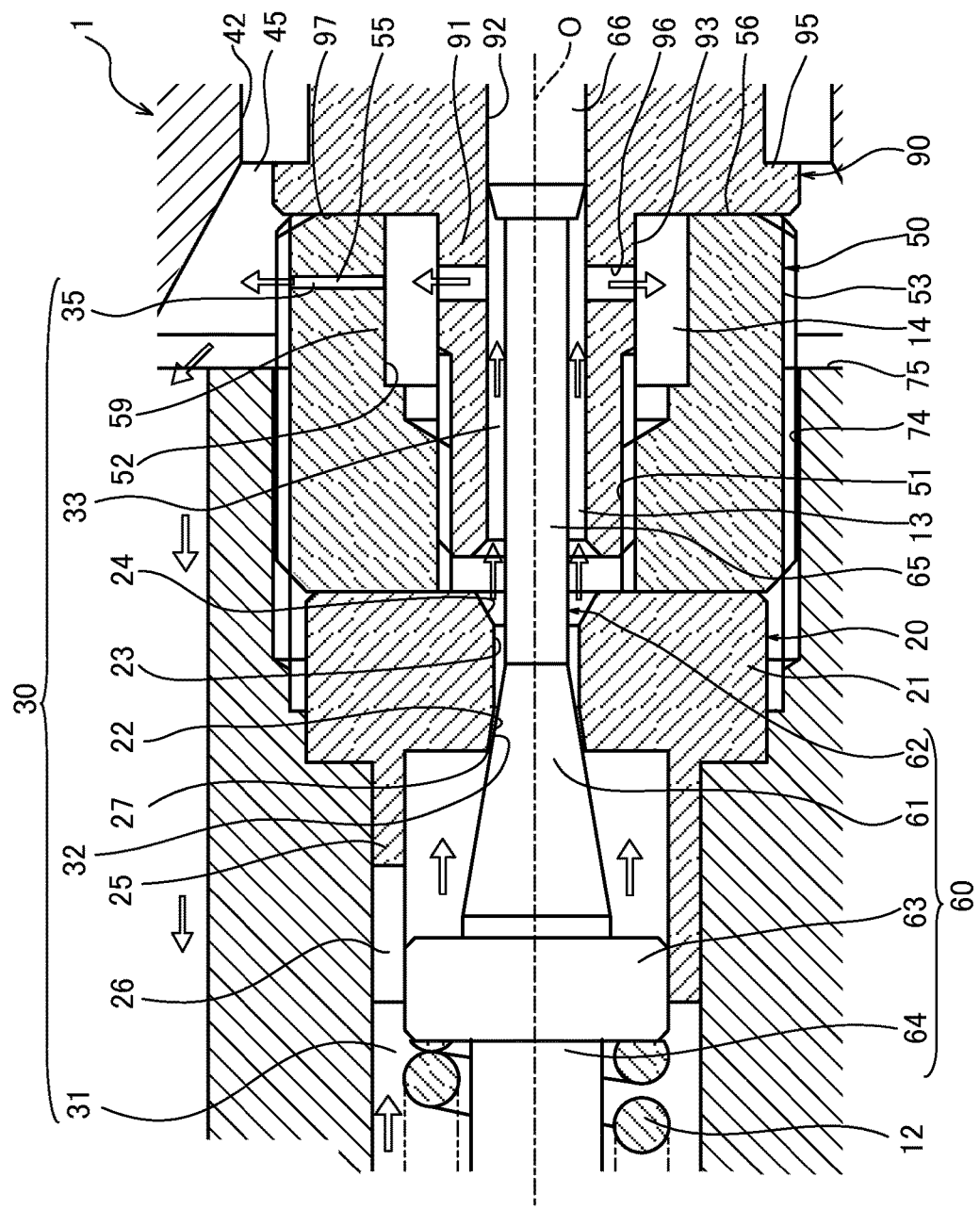
FIG. 4 is a longitudinal cross-sectional view illustrating a control valve according to a second embodiment of this invention.

Next, a second embodiment of this invention will be described with reference to FIG. 4. FIG. 4 is a cross-sectional view illustrating a control valve 1. A configuration of the control valve 1 is basically similar to that of the first embodiment. In the following description, only a difference from the first embodiment will be focused. In FIG. 4, like reference numerals denote like elements as in the first embodiment.

A fluid rectifying unit 50 provided in the control valve 1 includes a poppet downstream path wall portion 59 that defines a poppet downstream path 33 and a plurality of communicating paths 35 opened to the poppet downstream path wall portion 59 to cause the poppet downstream path 33 and the control pressure chamber 45 to communicate with each other. The communicating path 35 is defined by a plurality of holes 55 formed in the fluid rectifying unit 50.

One end of each hole 55 is opened to the inner circumferential surface of the poppet downstream path wall portion 59 and faces the poppet downstream path 33. The other end of each hole 55 is opened to the outer circumferential surface of the poppet downstream path wall portion 59 and faces the control pressure chamber 45.

Each hole 55 is formed in a radial shape (straight line shape) such that each center line extends in a radial direction centered at the center line O. Each hole 55 is formed with an even interval in a circumferential direction.

A pressure of the gas flowing through the poppet passage 30 is regulated by the poppet valve body 61, and a vortex is generated in the downstream side of the poppet-throttling fluid path 32. The gas having such a vortex is rectified as it flows to the communicating path 35 from the poppet downstream path 33. By rectifying the vortex generated in the downstream side of the poppet-throttling fluid path 32, it is possible to prevent a noise from being generated from the control valve 1.

In the aforementioned embodiment, it is possible to obtain the following effects and advantages.

(1) The fluid rectifying unit 50 for rectifying a fluid having a pressure regulated by the poppet valve 60 is provided in the valve seat 20. For this reason, the vortex generated in the fluid (gas) passing through a gap between the seat portion 22 of the valve seat 20 and the poppet valve 60 is rectified as it passes through the fluid rectifying unit 50. As a result, it is possible to reduce a noise of the control valve 1 caused by the vortex of the fluid.

(2) The fluid rectifying unit 50 is provided in the end portion of the valve seat 20. For this reason, it is possible to cause the fluid rectifying unit 50 to approach the seat portion 22 of the valve seat 20. Therefore, it is possible to effectively rectify the vortex generated in the fluid (gas) passing through a gap between the seat portion 22 of the valve seat 20 and the poppet valve 60 using the fluid rectifying unit 50.

(3) The control valve 1 includes the poppet downstream path 33 provided between the poppet valve 60 and the fluid rectifying unit 50, and the control pressure chamber 45 provided in the downstream side of the fluid rectifying unit 50 and defined by the piston 40 that drives the poppet valve 60. Since the fluid rectifying unit 50 has the communicating path 34 that causes the poppet downstream path 33 and the control pressure chamber 45 to communicate with each other, it is possible to suppress a vortex of the fluid from being guided to the control pressure chamber 45 and prevent a noise from being generated from the control valve 1. In addition, since the communicating path 34 is provided in the upstream side of the control pressure chamber 45, it is possible to suppress a change of the pressure of the fluid guided to the fluid supply destination by a resistance applied to the fluid flow by the communicating path 34.

It is noted that a means for opening or closing the poppet valve 60 is not limited to the piston 40 operated by virtue of a fluid pressure, and other types of actuators may also be employed.

(4) Since the communicating path 34 is formed by the trench 57 provided in the fluid rectifying unit 50, it is possible to rectify a vortex as the fluid passing through the communicating path 34 runs along the trench 57.

In addition, since the communicating path 35 is formed by the trench 57, a machining work of the communicating path 35 becomes easy. For this reason, it is possible to easily change a setting of the control valve 1 by changing the shape and the depth of the trench 57 depending on a characteristic required in the control valve 1.

(5) Since the cross-sectional area of the communicating path 34 gradually increases toward the downstream side, a pressure of the fluid flowing through the communicating path 34 gradually decreases. Therefore, it is possible to improve an effect of rectifying the fluid flow and suppress a resistance applied to the fluid flow.

(6) Since the communicating path 34 extends to a radial direction (center line S direction) of the poppet valve 60 from the poppet downstream path 33, a direction of the fluid flow is converted from the axial direction of the poppet valve 60 to the radial direction. Therefore, it is possible to guide the fluid to turn at the communicating path 34. As a result, it is possible to suppress the path length of the poppet passage 30 from increasing in the axial direction of the poppet valve 60 and avoid a size of the control valve 1 from increasing.

(7) According to the second embodiment, since the communicating path 35 is defined by the hole 55 provided in the fluid rectifying unit 50, the flow is rectified as the fluid flows along the inner circumferential surface of the hole 55. It is noted that the configuration of each hole 55 is not limited to the aforementioned one. Instead, the inner circumferential surface of the hole 55 may be formed in a truncated conical shape (fan-like tapered shape) whose diameter is reduced toward the downstream side.

As a result, the cross-sectional area of the communicating path 35 gradually increases toward the downstream side. Therefore, a pressure of the fluid flowing through the communicating path 35 gradually decreases so that it is possible to improve an effect of rectifying the fluid flow and suppress the resistance applied to the fluid flow.

Embodiments of this invention were described above, but the above embodiments are merely examples of applications of this invention, and the technical scope of this invention is not limited to the specific constitutions of the above embodiments.

This application claims priority based on Japanese Patent Application No. 2012-059443 filed with the Japan Patent Office on Mar. 15, 2012, the entire contents of which are incorporated into this specification by reference.

The invention claimed is:

1. A control valve configured to control a pressure of a fluid, the control valve comprising:
    a valve seat having a seat portion where the fluid passes;
    a poppet valve inserted into the valve seat so as to be displaceable with respect to the valve seat to regulate a pressure of the fluid passing through the seat portion;
    a fluid rectifying unit provided on a downstream side of the valve seat to rectify the fluid having a pressure regulated by the poppet valve;
    a plug; and
    a control pressure chamber provided on a downstream side of the fluid rectifying unit,
    wherein
    the poppet valve comprises
        a poppet valve body, a small-diameter rod portion connected to a leading end of the poppet valve body and a larger-diameter rod portion connected to the small-diameter rod portion and having a greater diameter than the small-diameter rod portion, a part of the small-diameter rod portion is inserted into the plug, the plug has an inner circumferential surface on which the larger-diameter rod portion is slidable, the fluid rectifying unit comprises an inner path through which the fluid passes, the inner path includes
  a poppet downstream path formed in the plug, around the small-diameter rod portion, and between the seat portion and the larger-diameter rod portion, and
  a communicating path that communicates the poppet downstream path and the control pressure chamber in a radial direction of the poppet valve, the poppet valve further comprises a poppet-throttling fluid path defined between the seat portion and the poppet valve body, a minimum cross-sectional area of the communicating path is larger than a maximum cross-sectional area of the poppet-throttling fluid path, and the communicating path is provided between the fluid rectifying unit and the plug.

2. The control valve according to claim 1, wherein the fluid rectifying unit is provided in an end portion of the valve seat.

3. The control valve according to claim 1, further comprising:
  a piston configured to drive the poppet valve and define the control pressure chamber.

4. The control valve according to claim 1, wherein the communicating path includes a groove provided in the fluid rectifying unit.

5. The control valve according to claim 1, wherein the communicating path has a cross-sectional area gradually increasing toward a downstream side.

6. The control valve according to claim 1, wherein the communicating path extends from the poppet downstream path in the radial direction of the poppet valve.

7. The control valve according to claim 1, wherein
the fluid rectifying unit comprises a cylindrical portion,
the control pressure chamber is provided on an outer side of the cylindrical portion, and
the communicating path is formed in the radial direction of the poppet valve to communicate with the control pressure chamber.

8. The control valve according to claim 1, wherein the fluid rectifying unit and the valve seat are integrated into a single body.

9. The control valve according to claim 1, wherein a cross-sectional area of the communicating path is configured to not be affected by a displacement position of the poppet valve with respect to the valve seat.

10. A control valve configured to control a pressure of a fluid, the control valve comprising:

a valve seat having a seat portion where the fluid passes;
a poppet valve inserted into the valve seat to regulate a pressure of the fluid passing through the seat portion;
a fluid rectifying unit provided on a downstream side of the valve seat to rectify the fluid having a pressure regulated by the poppet valve; and
a control pressure chamber provided on a downstream side of the fluid rectifying unit, wherein
the fluid rectifying unit comprises an inner path through which the fluid passes,
the inner path is provided on a downstream side of the seat portion and is communicated with the control pressure chamber, and
the fluid rectifying unit has a hexagonal cross-sectional inner circumferential surface and a circular cross-sectional outer circumferential surface.

11. A control valve configured to control a pressure of a fluid, the control valve comprising:
a valve seat having a seat portion where the fluid passes;
a poppet valve inserted into the valve seat so as to be displaceable with respect to the valve seat to regulate a pressure of the fluid passing through the seat portion;
a fluid rectifying unit provided on a downstream side of the valve seat to rectify the fluid having a pressure regulated by the poppet valve;
a plug; and
a control pressure chamber provided on a downstream side of the fluid rectifying unit,
wherein
the poppet valve comprises
  a poppet valve body,
  a small-diameter rod portion connected to a leading end of the poppet valve body and
  a larger-diameter rod portion connected to the small-diameter rod portion and having a greater diameter than the small-diameter rod portion,
a part of the small-diameter rod portion is inserted into the plug,
the plug has an inner circumferential surface on which the larger-diameter rod portion is slidable,
the fluid rectifying unit comprises an inner path through which the fluid passes,
the inner path includes
  a poppet downstream path formed in the plug, around the small-diameter rod portion, and between the seat portion and the larger-diameter rod portion, and
  a communicating path that communicates the poppet downstream path and the control pressure chamber in a radial direction of the poppet valve,
the poppet valve further comprises a poppet-throttling fluid path defined between the seat portion and the poppet valve body,
a minimum cross-sectional area of the communicating path is larger than a maximum cross-sectional area of the poppet-throttling fluid path, and
the communicating path is defined by a hole provided in the fluid rectifying unit.

\* \* \* \* \*